UNITED STATES PATENT OFFICE.

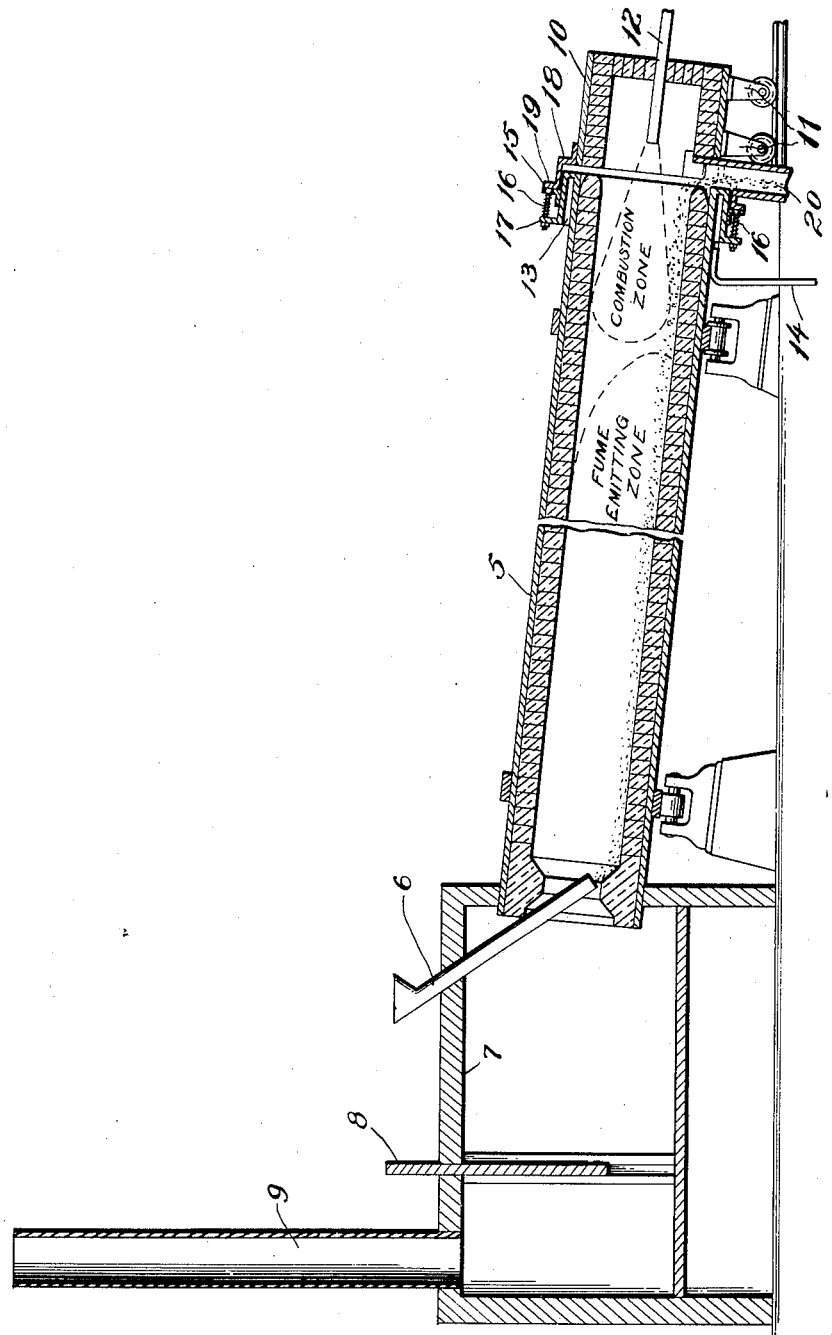

HOWARD FIELD CHAPPELL, OF NEW YORK, N. Y.

METHOD OF CALCINING ALUNITE.

1,401,136.  Specification of Letters Patent.  Patented Dec. 27, 1921.

Application filed August 2, 1920. Serial No. 400,640.

*To all whom it may concern:*

Be it known that I, HOWARD F. CHAPPELL, a citizen of the United States, residing at New York, in the county of New York, State of New York, have invented certain new and useful Improvements in Methods of Calcining Alunite; and I do hereby declare the following to be a full, clear, and exact description of the invention, such as will enable others skilled in the art to which it appertains to make and use the same.

In an application for Letters Patent of the United States, filed May 28, 1918, Serial No. 236,981, I have described a method of calcining alunite wherein the alunite is first subjected to the action of hot products of combustion until the greater part of the fumes of oxids of sulfur have been emitted, and wherein, to complete the calcination the alunite is brought into the combustion zone of the furnace and subjected to direct heating therein. Among the advantages incident to the process therein described are an important economy in fuel, increased temperature in the calcining furnace, increased output, the avoidance of the necessity of a large excess of air or oxygen, more effective heating of the alunite undergoing calcination, and reduction in the wear and tear on the combustion chamber, where this chamber is protected by the alunite undergoing calcination.

The present invention relates to improvements in the method of calcining alunite at high temperatures, even above the high temperature at which sulfate of potash volatilizes, without appreciable loss of potash by volatilization. It is based upon the discovery that, by observing certain conditions of operation, the process of calcination of the alunite may be so conducted as to cause the surface of the material undergoing calcination to assume a pasty or plastic form, this condition being brought about by the partial fusing or softening of the sulfate of potassium, which then binds together in an agglutinated or pasty film the more refractory particles of alumina that constitute the major part of calcined alunite; and that, if the agglutinated or pasty film be then promptly removed from the direct action of the products of combustion and before it forms into large solid agglomerates, the potash will escape volatilization and can thereafter be leached out from the material discharged from the kiln, thereby obtaining insoluble aluminum oxid, and leachings from which the potash may be recovered.

While I prefer to use a kiln of the rotary type, such as described in my application, Serial No. 236,981, hereinbefore referred to, the process may nevertheless be conducted in any suitable form of calcining apparatus that permits the removal of the surface of the material as soon as it becomes agglutinated from the action of the high temperatures incident to the calcining operation.

If a kiln of the rotary type is used, such as is described in my said application, Serial No. 236,981, the ore feed and the rate of revolution of the kiln should be so adjusted that, at the temperatures employed, the surface of the alunite undergoing calcination acquires, by reason of the partial fusion and softening of the sulfate of potasium, an agglutinated condition, the alumina particles contained in the surface film being agglutinated or stuck together by the softened sulfate particles. In this condition, the agglutinated surface film is to be promptly removed from direct contact with the products of combustion, so that it will finally pass out with the discharge from the kiln without permitting the potash therein to volatilize. This removal of the surface film or layer from direct contact with the products of combustion will be effected, in a kiln of the rotary type, by the rotation of the kiln, inasmuch as the material will be elevated on one side of the kiln and will then fall back on the material below, thus continually exposing fresh surfaces and covering up the previously heated and agglutinated surface layers. The desired plasticity of the surface of the material should still leave it in a condition sufficiently strong to retard the free flow of the finely disintegrated alunite, elevating it several degrees higher on the wall of the rotating kiln than would be the case if the surface were not in the plastic or agglutinated condition. It is desirable however that the plastic superficial film should not be carried up so high on the walls of the rotating kiln as to cause undue dust when the film breaks, and, indeed, it is desirable, that the film should not fuse upon the side walls of the kiln.

In carrying out the invention, it will be found that a thickness of film within a range of one and one-half to four inches is satisfactory. Inasmuch as the rate of the feed, the rate of rotation of the kiln, and the firing are within the control of the operator, it is within his power to so adjust them relatively to each other as to realize the desired conditions of practice. The formation and maintenance of the film may be noted by direct observation, care being taken to protect the eyes, by suitable colored glasses, from injury from the action of the high temperatures prevailing. So also, the temperature conditions may be noted by placing pyrometers at suitable places along the kiln, and the general progress of the operation may be observed and checked by noting the physical and chemical composition and behavior of the products discharged from the kiln.

The products discharged from the kiln should be very white and should be accompanied with very little dust or gas. In some instances, the material discharged may tolerate the presence of agglutinated particles ranging from a fraction of an inch to an inch in size, and, at times, material loosely held in masses of a foot or more in length and several inches in diameter may be present; but the discharge should contain no considerable amount of particles of alunite which have become so highly heated as not to be readily disintegrated and broken up by application of slight pressure.

The material discharged from the kiln and allowed to remain at rest in a protected place will agglomerate to an easily friable mass for a depth of several feet. It may also contain solid particles of rock and gangue that accompanied the alunite fed into the kiln; but it should not contain any material amount of fused particles of potassium aluminate.

The calcined ore is then lixiviated in water, soluble sulfates being dissolved out of the calcined alunite by any ordinary method of leaching, thereby leaving aluminum oxid. Soluble sulfates are recovered in any suitable manner from the leachings.

In the accompanying drawing, I have shown in longitudinal section, a rotary kiln of the form illustrated in my application, Serial No. 236,981, hereinbefore referred to; although it will be understood that the scope of the invention is not limited to this particular type of kiln.

In so far as I am aware, it is broadly new in the art to conduct the operation of calcining alunite in such manner that the sulfate of potassium shall be partially fused and recovered as such without having undergone any substantial volatilization. The important technical advantage due to the invention is that calcining alunite is made possible with the employment of temperatures even beyond those at which potash will volatilize, and yet with the recovery of the potash in its substantial entirety as a part of the calcined material discharged from the kiln, and, in such condition, that it may be leached out by water from the residual aluminum oxid.

What I claim is:

1. The process of calcining alunite, which comprises subjecting the alunite during the process of calcination to a temperature in excess of that at which potassium sulfate volatilizes until substantially all of the potassium compounds contained therein are converted into potassium sulfate, and substantially all of the aluminum compounds into aluminum oxid, the mass undergoing calcination being agglutinated at its surface by the partial fusion and softening of the potassium sulfate, and removing the agglutinated surface film, as it forms, from the volatilizing action of the high temperature, whereby volatilization of the potassium sulfate during the calcining operation is substantially avoided; substantially as described.

2. The process of calcining alunite, which comprises projecting products of combustion upon the surface of the alunite undergoing calcination, the temperature of the products of combustion being higher than the temperature at which potassium sulfate volatilizes, partially fusing and softening the potassium sulfate and thereby forming an agglomeration of the potassium sulfate with particles of alumina at the zone of projection of the products of combustion, and progressively removing the said agglomeration from the further action of the products of combustion, whereby any substantial volatilization of the potassium sulfate is avoided; substantially as described.

3. The process of calcining alunite in a rotary horizontally inclined kiln, which comprises projecting a blast of products of combustion upon the surface of the alunite as it is fed through the kiln, the temperature of the blast being higher than the temperature at which potassium sulfate volatilizes, so regulating the feed of the alunite and the rate of revolution of the kiln that by fusion of the potassium sulfate a superficial film or layer of a pasty character will be formed upon the alunite at the zone of projection of the blast thereupon, and progressively removing the pasty film thus formed from the further action of the blast whereby any substantial volatilization of the fused potassium sulfate is avoided; substantially as described.

In testimony whereof I affix my signature.

HOWARD FIELD CHAPPELL.